United States Patent [19]

Hornbeck et al.

[11] 4,054,403
[45] Oct. 18, 1977

[54] EXTRUDER WITH DUAL FLIGHTED EXTRUSION SCREW

[75] Inventors: Robert Lee Hornbeck, Mineral Wells; Norman John Brozenick, Vienna, both of W. Va.

[73] Assignee: Borg-Warner Corporation, Chicago, Ill.

[21] Appl. No.: 714,549

[22] Filed: Aug. 16, 1976

[51] Int. Cl.² .............................................. B29F 3/06
[52] U.S. Cl. ............................... 425/133.1; 100/145; 264/173; 425/208; 425/376 R; 425/817 C
[58] Field of Search ...................... 259/191; 222/136; 100/145,150; 198/657; 416/177; 425/133.1, 208, 133.5, 4 C, 817 C, 376 R; 264/171, 173, 45.9, 209

[56] References Cited

U.S. PATENT DOCUMENTS 3,314,108  4/1967  Wienand et al. .................. 425/133.1

FOREIGN PATENT DOCUMENTS 343,839  2/1960  Switzerland ...................... 425/133.1

Primary Examiner—Robert D. Baldwin
Assistant Examiner—Mark Rosenbaum
Attorney, Agent, or Firm—William S. McCurry

[57] ABSTRACT

An extruder has a single screw with two separate inlet hoppers feeding two separate screw flights to deliver two separate materials to a multiple channel extruder die.

2 Claims, 3 Drawing Figures

EXTRUDER WITH DUAL FLIGHTED EXTRUSION SCREW

BACKGROUND OF THE INVENTION

The present invention relates to a novel extruder which contains a screw which has separate, dual flights thereon whereby two separate thermoplastic materials can be separately extruded in a single extruder to give a product having separate co-extruded layers of thermoplastic materials.

It is common in the art to co-extrude multiple layers of thermoplastic material to provide multilayered products such as pipe and sheet. The conventional equipment for co-extrusion comprises two or more extruders feeding multiple channels of a single die or tool. See, for example, U.S. Pat. No. 3,649,143.

By use of the presently disclosed invention, a single extruder feeds the tool or die, thus eliminating the costs of multiple extruders. The extruder screw of the present invention is provided with two or more flights, each being fed by separate hoppers, and each delivering thermoplastic separately to the die of the extruder.

In order that there be a single conveyance of the material through the extruder, there is substantially no clearance between the flight of the screw and its confining chamber or barrel, and the screw must have a substantially constant pitch and root diameter. Two separate sets of flights, each being fed separately, are used to convey and melt the thermoplastic materials and feed them to an extrusion die. The thermoplastic materials maintain their own distinct identity in the extruder until they are fed separately to the die for co-extrusion.

BRIEF DESCRIPTION OF THE DRAWINGS

A better understanding of the present invention may be had from the accompanying drawings, taken with the description thereof wherein.

The present extruder structure may be used for making any desired multilayered sheet, pipe or film product. A particular application contemplated is the co-extrusion of multilayered pipe made of a layer of acrylonitrile-butadienestyrene graft polymer (ABS) and a layer of polyvinyl chloride (PVC). The invention, when using the die of FIG. 2, may be used for making multilayer pipe wherein the inner and outer surfaces are made of solid ABS and the center layer being a foamed ABS. Also, by utilizing a sheet die such as shown in FIG. 3, a multilayer sheet can be made having layers of different colors and/or different thermoplastics. Another contemplated use of the FIG. 3 modification is to make multilayered ABS sheet having a solid skin surface and having a foamed interior. Plastics other than ABS and PVC can be utilized for making a variety of products. To mention only a few — polyolefins, polycarbonates, polystyrenes, polyacetals, polyphenylene oxides and alloys or combinations of these thermoplastic materials.

Figure 1:
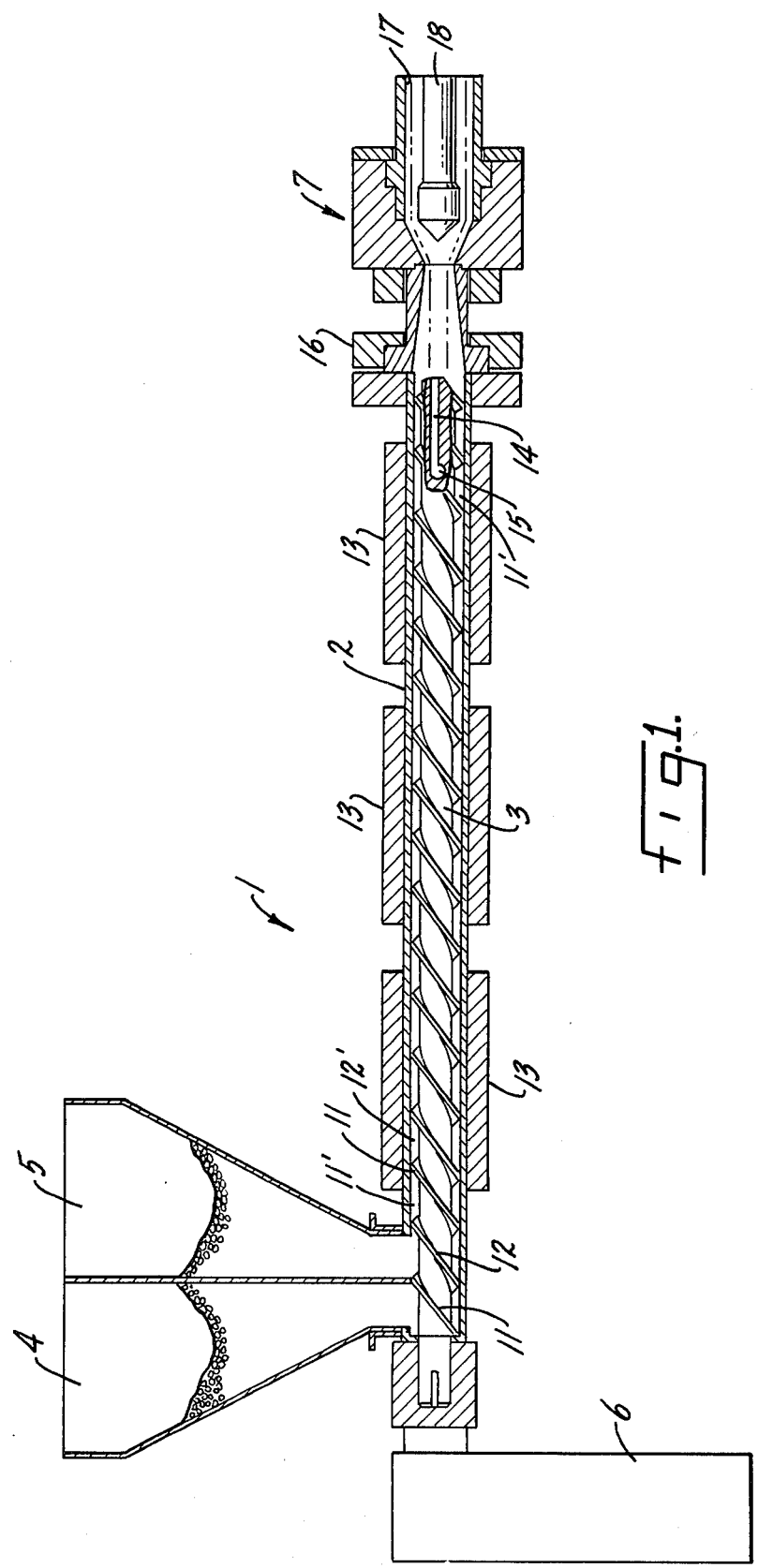
FIG. 1 is a sectional view of an extruder made in accordance with the present invention.

Referring now to FIG. 1, there is disclosed an extruder designated generally by the reference numeral 1. The extruder 1 comprises a barrel 2 defining a cylindrical container having an inner wall, a screw body 3 rotatably disposed within said barrel, feed hoppers 4 and 5, drive means 6, and a tool or die 7. The screw body 3 has two parallel flights 11 and 12 providing parallel channels 11' and 12', respectively, between the screw body 3 and the inner wall of the barrel 2. Incidentally, the barrel 2 is heated by electrical heaters 13 in a conventional manner to provide heat for melting the thermoplastic as it is moved by the flights 11, 12 along the barrel 2 toward the die 7.

A bore 14 is provided in end of the screw body 3 and extends rearwardly to an opening 15 which is in communication with the channel 11'.

The pipe die 7 is attached to an adapter ring 16 which in turn is attached to the extruder barrel 2. The die 7 has a barrel or sleeve 17 containing a tool 18 for shaping the melted thermoplastic into pipe.

In the operation of the apparatus of FIG. 1, PVC resin is fed to the hopper 4 and ABS resin is fed to the hopper 5. The barrel 2 is heated by the heaters 13 and drive means 6 is actuated to rotate the screw 3. As the screw 3 rotates the PVC is conveyed forwardly by the screw flight 12 through the channel 11' and the ABS is conveyed forwardly simultaneously by the screw flight 11 and through the channel 12'. As the materials progress toward the pipe die 7, they become molten because of the heat applied by heaters 13. As the PVC nears the end of the screw 3, it enters the opening 15 and travels through the bore 14 from which it is discharged into the adapter 16 and through the die 7 to form the interior layer of a plastic pipe. Simultaneously, the ABS is conveyed forwardly through the channel 12' and exits through the adapter 16 into the die 7 to form the exterior layer of the pipe. The two layers are thus melt or heat laminated together to form a composite pipe having an ABS exterior surface and a PVC interior surface.

The presently disclosed extruder can also be used to make ABS or PVC pipe with a solid interior and exterior skin and a foamed inner layer when an appropriate tool is attached to the extruder end in place of the adapter 16 and die 7. Such a tool is disclosed in FIG. 2 of the drawings.

Figure 2:
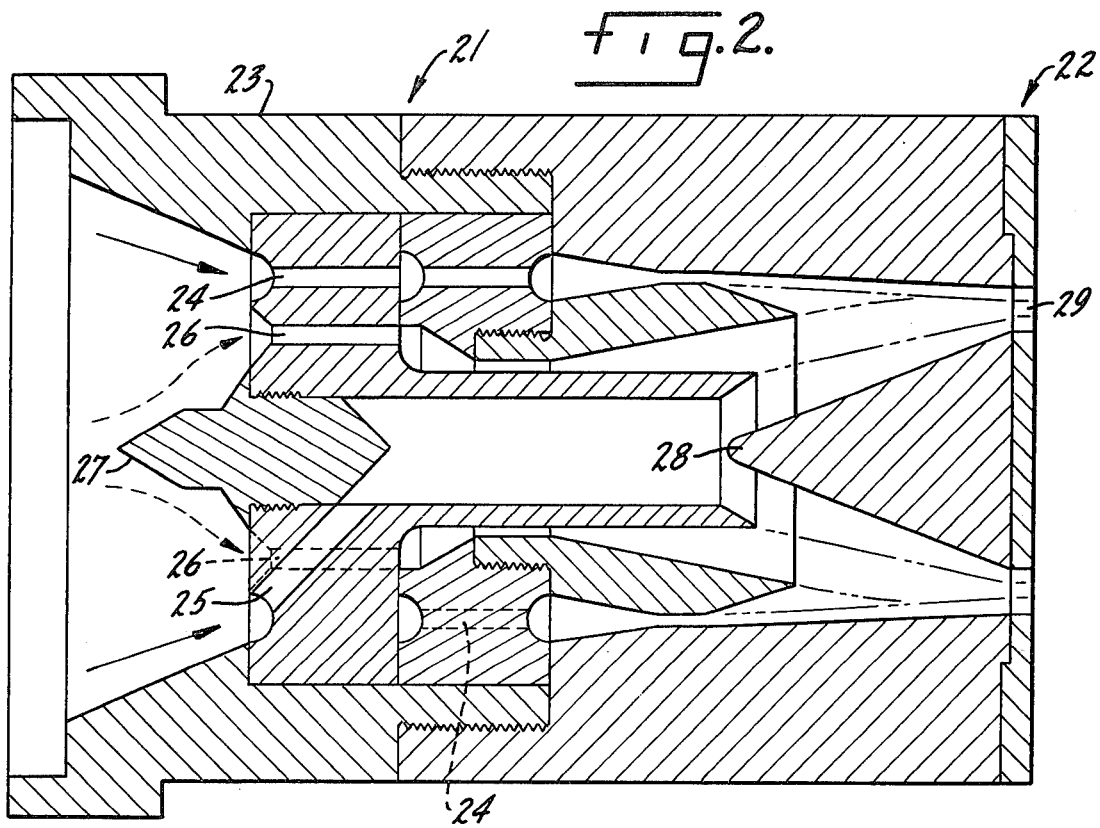
FIG. 2 is a sectional view of a different die for use with the extruder of FIG. 1.
Figure 3:
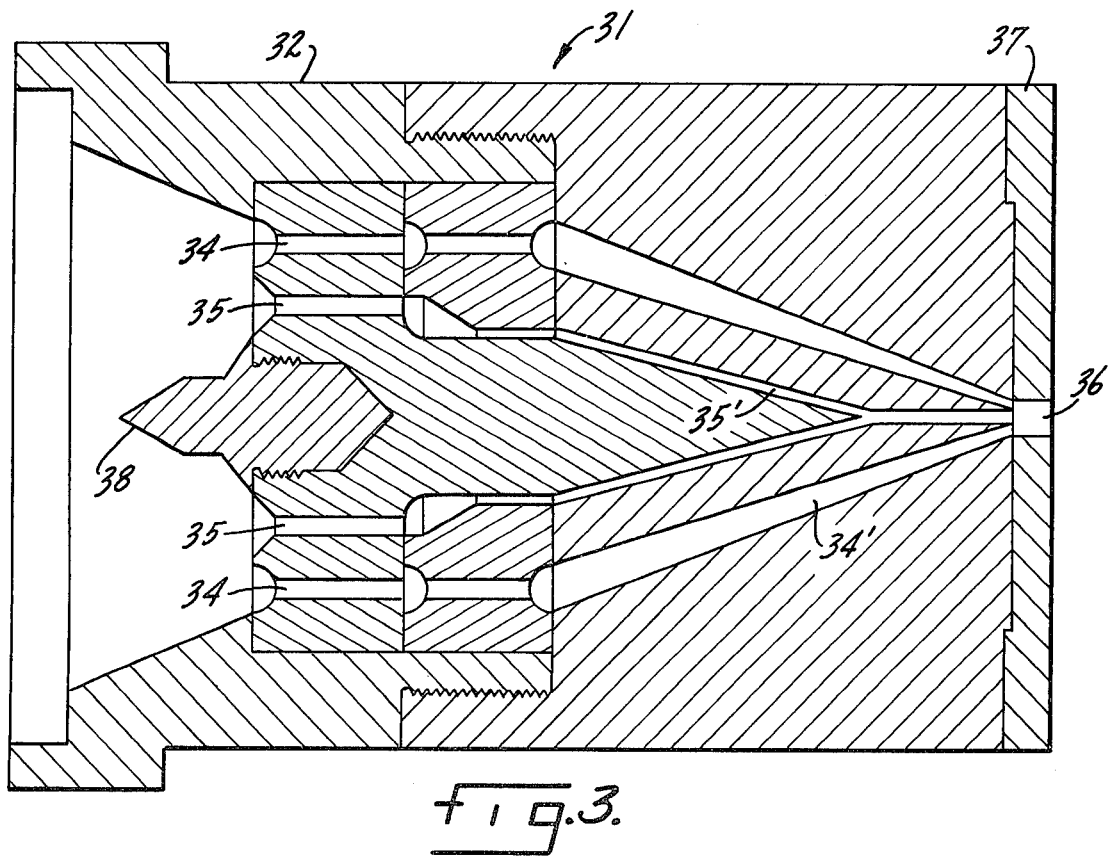
FIG. 3 is a cross-sectional view of still a different die for use with the extruder of FIG. 1.

Referring to FIG. 2, there is disclosed a tool comprising an adapter 21 and a pipe die 22 which may be used with the extruder of FIG. 1. The adapter 21 comprises a housing 23 containing a plurality of passageways 24, 25, and 26. The passageways 24 are in communication with the channel 1' of the extruder 1; the passageways 25 are also in communication with the channel 12'; and the passageways 26 are in communication with the channel 11' of the extruder 1. The adapter 21 contains a mandrel or spreader 27 and the die 22 contains a mandrel or spreader 28 and a die orifice 29.

Foamable ABS is charged to the hopper 4 and standard ABS is charged to the hopper 5. The foamable ABS contains a heat decomposable blowing agent such as azodicarbonamide which will decompose in the heated extruder to produce nitrogen gas. As the extruder 1 is placed in operation, the non-foamable ABS is conveyed forwardly through the channel 12' and the molten ABS is discharged into the passageways 24 and 25 of the adapter 21. The ABS entering passageways 24 passes through the exterior surface of the die orifice 29 to form the exterior surface of the pipe while the same ABS entering passageways 25 is diverted by the mandrel 28 and passes through the interior surface of the die orifice 29 to form the interior surface of the pipe. In the meantime the foamable ABS, which has been heated to the decomposition temperature of the blowing agent in channel 11' of the extruder, is diverted by the mandrel 27 and is discharged into the passageways 26 of the adapter 21 and flows through the die orifice 29 between the layers of ABS forming the interior and exterior surfaces. As the now formed pipe emerges from the die 22 the foamable ABS, which prior to exiting through the die orifice 29 could not foam due to the pressures within the extruder and adapter, now foams or expands to form the pipe having solid exterior and interior surfaces and a foamed ABS interior.

Sheet material having a foamed interior can also be made using the extruder 1 when a sheet die such as disclosed in FIG. 3 is attached to the extruder. In FIG. 3, the sheet die 31 comprises a housing 32 having formed therein passageways 34, 34', 35, 35' in communication with an elongated die orifice 36 of a die plate 37. A mandrel or spreader 38 is provided in the die 31.

The operation of the extruder 1 to make sheet material having an inner foam layer is substantially the same as when operating with the pipe die of FIG. 2. Standard ABS thermoplastic is charged to the hopper 5 and ABS containing azodicarbonamide blowing or foaming agent is charged to the hopper 4. The non-foamable ABS is discharged from the channel 12' of the extruder, into the passageways 34 and 34' and emerges through the die orifice 36 to form the solid outer surfaces of the sheet. In the meantime, foamable ABS is charged to the hopper 4 and is discharged from the channel 11' into the passageways 35 and 35', and emerges through the center of the die orifice 36. As soon as the formed sheet emerges from the orifice 36, the foamable ABS of the interior expands to give an ABS sheet product having a foamed interior.

With respect to all the tools or dies described herein, suitable and conventional means are provided for forming and conveying the pipe or sheet as it emerges from the die orifices.

While the present invention has been described with reference to the melting of separate layers of PVC and ABS and/or separate layers of solid and foamable ABS, it is to be understood that the present extruder can be used to make many of variations of pipe and sheet utilizing various and different thermoplastic resins. The thermoplastic resins utilized in making pipe and sheet in accordance with the present invention may be, for example, ABS, PVC, phenylene oxide polymer, polycarbonate, polyethylene, polypropylene and polystyrene. Suitable foaming agents where one of the layers is foamable thermoplastic are bicarbonate of soda and citric acid, azodicarbonamide and the N-nitroso compounds. Modern Plastics Encyclopedia, 1975–1976, at page 126, discloses other foaming agents which can be utilized in making foamed thermoplastic materials. In the alternative, a fluid blowing agent such as nitrogen can be added to the molten thermoplastic in the extruder.

We claim:

1. A screw extruder adapted to convey thermoplastic materials from inlet to outlet in separate streams comprising a screw body rotatable within a barrel defining a cylindrical chamber having an inner wall, a feed inlet at one end of said chamber and a shaping die on the other end thereof, said screw body having a plurality of different, parallel flights on its outer surface providing a plurality of different parallel channels or passageways between the outer surface of the screw body and the inner wall of the barrel throughout substantially the axial extent of said chamber from said inlet to said die to prevent any mixing of the materials, and a plurality of separate feed hoppers connected to said feed inlet adapted to feed thermoplastic materials separately to the plurality of different parallel channels or passageways simultaneously.

2. A screw extruder adapted to convey two separate thermoplastic materials from inlet to outlet in separate streams comprising a screw body rotatable within a barrel defining a cylindrical chamber, a feed inlet at one end of said chamber and a shaping die on the other end thereof, said screw body having two different, parallel flights on its outer surface providing two different parallel channels or passageways between the outer surface of the screw body and the inner wall of the barrel throughout substantially the axial extent of said chamber from said inlet to said die to prevent any mixing of the materials, and two separate feed hoppers connected to said feed inlet adapted to feed the two separate thermoplastic materials to the two different parallel channels or passageways simultaneously.

* * * * *